Figure 1:
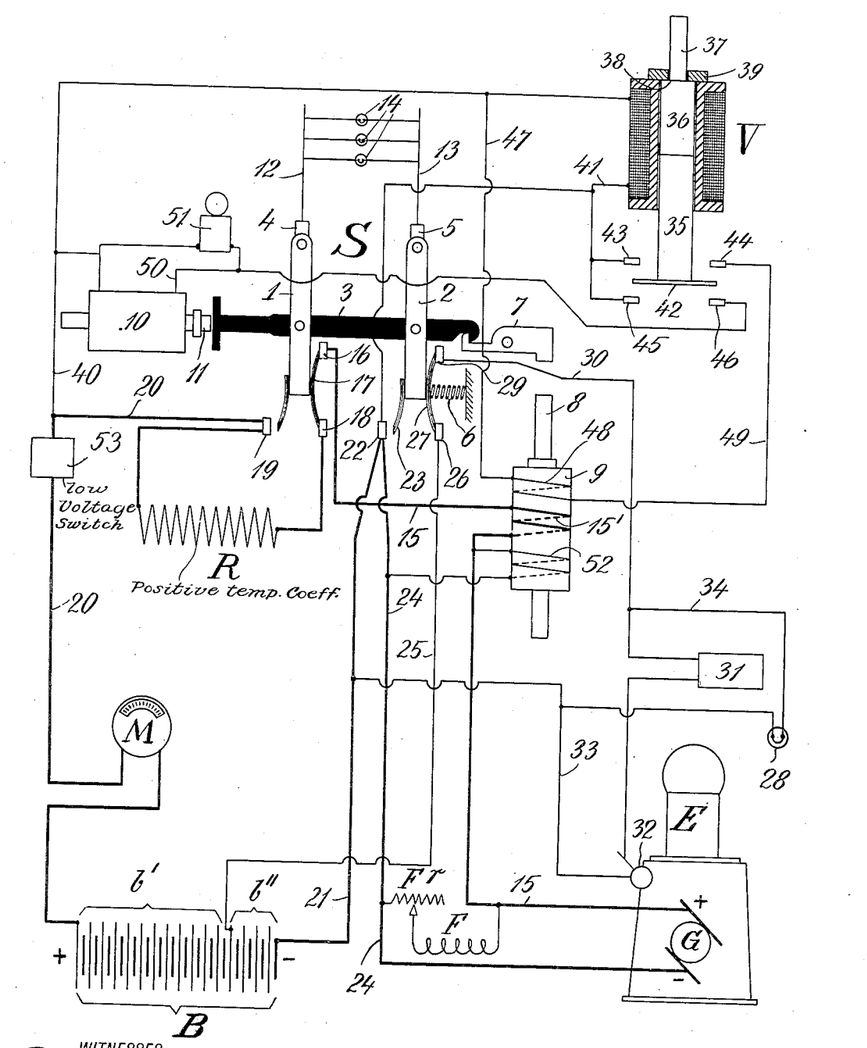

C. A. DAWLEY.
AUTOMATIC STORAGE BATTERY LIGHTING SYSTEM.
APPLICATION FILED MAR. 14, 1913.

1,126,184.

Patented Jan. 26, 1915.

UNITED STATES PATENT OFFICE.

CLARENCE A. DAWLEY, OF PLAINFIELD, NEW JERSEY.

AUTOMATIC STORAGE-BATTERY LIGHTING SYSTEM.

1,126,184.  Specification of Letters Patent.  Patented Jan. 26, 1915.

Application filed March 14, 1913. Serial No. 754,307.

*To all whom it may concern:*

Be it known that I, CLARENCE A. DAWLEY, a citizen of the United States of America, and a resident of Plainfield, in the county of Union and State of New Jersey, have invented a certain new and useful Automatic Storage-Battery Lighting System, of which the following is a specification.

My invention relates to automatic storage battery current-supply systems, particularly applicable to electric lighting and to relatively small or domestic electric lighting plants, and comprises a novel method of obtaining substantially the same voltage in the external circuit when current is being supplied thereto from a generator, as when current is being supplied thereto by the storage battery, and of compensating, as to such external circuit, for rise of voltage of the generator as charging of the battery progresses; also a novel method of regulating the rate of charge of the storage battery and of tapering the charge at the desired rate, and a novel method of stabilizing the system, notwithstanding variations in voltage of the generator due to variations of speed thereof; also other novel features of method, hereinafter described and particularly pointed out in the appended claims.

My invention further comprises improved automatic switching means, controlled by the varying voltage of the battery, for connecting and disconnecting the battery and the generator to and from the external circuit, and to and from each other; a novel arrangement of circuits, battery cells, and generator, whereby during the charging period of the battery, a portion of the cells of the battery are included in the external circuit to reduce, by their counter-voltage, the otherwise excessive voltage of the generator current; means for counteracting over-charge of the cells so included in the external circuit; and other features, as hereinafter described and particularly pointed out in the appended claims.

One object of my invention is to provide a method of current supply and apparatus for current supply, whereby substantially constant voltage is maintained on the lamps or other electrical-energy-consuming means of the external circuit, irrespective of whether current is being supplied to that circuit by the generator or by the battery, and irrespective of rising voltage of the generator during charging of the battery.

A further and very important object of the invention is to provide means whereby a battery may be charged automatically without skilled or other attention and whereby the rate of charge is automatically decreased in the proper proportion as the charging progresses.

A further object is to stop the charging automatically when the desired charge voltage is reached and simultaneously to connect the lamps or other electrical-energy-consuming means to the battery so that substantially the same voltage is applied to the lamps as during the charging period.

A further object is to provide means whereby current-generating means, such as a driven generator, may be started automatically when the batteries need recharging, and whereby such current-generating means may be stopped, and the charging circuit disconnected, when the charge is complete, or at any time during the charge in case the engine or generator fails to produce the necessary voltage.

Other objects of my invention are to increase the life and capacity of storage batteries by regulating the charge and discharge, to equalize the work on the different cells of the battery, to insure complete charging of all the cells, to provide positive and easily controlled means whereby the discharged and charged condition may be indicated and charging started or stopped as required, and to prevent excessive rates of charge or discharge. Also to permit of a variable load on the external circuit and to decrease the amount of charge to the battery so that the generator capacity may be available for use in the external circuit when desired and the battery floated on the line to take any excess capacity of the generator, or to supplement the generator when the latter is in itself inadequate for the load.

A further object of my invention is to avoid possibility of short-circuiting of the battery in case the driving motor of the generator shall fail to start when turned over by the generator under the influence of the storage battery current, for that purpose.

I will now proceed to describe my invention with reference to the accompanying drawing, illustrating diagrammatically apparatus embodying the apparatus portion of my invention, and adapted for carrying out the process or method portion of my invention, and will then point out the novel features in claims.

According to my invention I employ a switch, preferably a double-pole switch, and preferably a switch provided with means for automatically operating it, which switch is provided with suitable contacts whereby the entire storage battery is connected to the circuit to which current is to be supplied (which circuit is termed herein, for convenience, the external circuit) during the discharging period of the storage battery, and whereby the charging generator is connected both to the battery and to the said external circuit during the charging period of the battery. It is desirable that the voltage of the current supplied to the said external circuit shall be practically the same, whether that current be supplied from the battery, or from the charging generator. Since, in order to charge the battery with reasonable rapidity, the voltage of the charging current should be somewhat higher than the normal battery voltage during discharge, and since it is not desirable to employ mere resistance to reduce this charging voltage with respect to the external circuit to bring it down to the normal discharge voltage of the battery, I provide contacts and circuits so arranged that during the charging period the battery is divided and a portion of this battery is included, during the charging period in series with the external circuit, the counter-voltage of the portion of the battery so included in series with the external circuit serving to reduce the voltage of the current supplied from the charging generator to the external circuit. During the charging period the entire battery is connected in shunt across the circuit by which current is supplied to the external circuit; from which it follows that that portion of the battery connected in series with the external circuit, during the charging period, receives an excess charge; but such excess charge effect I substantially neutralize by drawing current for various auxiliary purposes from the portion of the battery subject to the excess charge.

As the counter-voltage of the battery rises, during charging, and as this effect would reduce too rapidly the rate of charge, if it were not counteracted in part, I preferably employ, as the charging generator, a generator of such characteristic that its voltage rises somewhat as the current it supplies decreases; and I further provide, in series with the battery during the charging period, a resistance conductor having a positive temperature coefficient, that is to say, a resistance conductor the resistance of which rises with increase of strength of current flowing through it and decreases with decrease of strength of current flowing through it. During the early portion of the charging period the rate of charge may be relatively high without detriment to the battery, and with advantage; and therefore I so adjust the field resistance of the generator as to produce a relatively high rate of charge during the early part of the charging period. I have found that the rate of charge of a battery decreases very greatly with relatively slight increase in resistance in the charging circuit, and, conversely, increases greatly with relatively slight decrease in resistance in the charging circuit. During the early portion of the charging period the resistance of the resistance conductor of positive temperature coefficient will, naturally, be relatively high, because of the large amount of current flowing; but as the counter-voltage of the battery rises during the charging period, and the flow of current into the battery decreases, the resistance of this resistance conductor of positive temperature coefficient will decrease, and the voltage of the generator will increase, thereby compensating in part for the increase of counter-voltage of the battery; and this continues until, when the battery is completely charged, the charging current has decreased in amperage to such an extent, and has risen in voltage to such an extent, that the automatic releasing device of the switch is operated, as hereinafter described, so disconnecting the external circuit and the batteries from the charging generator, and connecting the entire battery to the external circuit. The rise in counter-voltage of that portion of the battery which is included, as above stated, in series with the external circuit, during the charging period, substantially counteracts, with reference to the external circuit, the rise in voltage of the generator during the charging period, thus serving as an automatic regulator to keep the voltage in the external circuit practically constant during the charging period.

Referring to the accompanying drawing, G designates a suitable electric generator for supplying charging current to the storage battery, hereinafter mentioned, and for supplying current to the line or external circuit. As illustrated, this generator is a shunt-wound generator, F designating its field coils, and F$^r$ an adjustable field resistance, by means of which the voltage of the generator current may be regulated.

For the reason explained above, I prefer to employ a generator so wound that its voltage increases slightly with decrease of current flow. I have indicated that this generator is driven by a prime mover E, preferably an internal combustion engine; of course in a broad sense, it is immaterial by what means the generator be driven; but specifically, the system herein described possesses some features in which the electric ignition circuit and devices of an internal combustion engine play important parts; and an internal combustion engine is furthermore convenient, as a source of power, in that it is simple, inexpensive in first cost and in operation, particularly in small sizes, and easily started and stopped and requires very little attention. It is to be understood, however, that current may be derived for my system from any suitable source, for example, street mains, and that the term "generator" as used in a broad sense in certain of the following claims, is used to include all sources of current supply, street mains included.

S designates a double-throw, double-pole switch, controlling the supply of current from the generator to the external circuit and to the battery, and the supply of current from the battery to the external circuit, and also controlling, in the arrangement shown, certain other features of the system. The switch, in the form shown diagrammatically, comprises pivoted conductor bars 1 and 2, connected by an insulating operator bar 3, and pivoted to and electrically connected to external circuit connections 4 and 5. The switch further comprises certain contact brushes and contact blocks, hereinafter mentioned, and further comprises a spring 6 tending to hold the switch in the position in which the battery is connected to the line or external circuit to supply current thereto. In the drawing, the switch is shown in the opposite or battery-charging position, and is shown as held there by engagement of a suitable detent 7 with the operator bar 3. The plunger 8 of a solenoid magnet 9 is arranged, when drawn upward as hereinafter described, to trip this detent 7 and permit the spring 6 to throw the switch to the opposite or battery-discharging position. The windings of the solenoid will be described hereinafter. The switch further comprises another solenoid magnet, 10, the plunger 11 of which, when attracted by the solenoid 10, shifts the switch against the spring 6 into battery-charging position.

B designates the storage or secondary battery, divided, for reasons hereafter apparent, into two sections $b'$ and $b''$, which in most cases will be unequal. The several cells of the battery are connected in series.

R designates a fixed resistance, preferably one of positive temperature coefficient (*i. e.*, composed of a conductor the resistance of which falls with fall of temperature, or, what is in most cases the same thing, with fall of current flow through it). As will be shown, this resistance R has several important functions, and is connected in circuit with the battery during charging of the latter, and also when current is being taken from the battery to operate the generator G as a motor to start the engine E. For convenience, and to distinguish this resistance R from other resistances of the system, I term it hereinafter, and in the claims, the "resistor."

V designates a relay, operated by rise and fall of voltage, as hereinafter described, for effecting the throwing of the switch S automatically. It may be of any suitable type, but the form shown, and to be described hereinafter, is convenient, and has certain desirable qualities.

12 and 13 designate external circuit conductors, *i. e.*, conductors of a circuit to which current is to be supplied by the battery B, or by the generator G, or by both battery and generator, as may be required. The current supplied to this circuit may operate any suitable current-consuming means; I have indicated such current consuming means, diagrammatically, as lamps, 14, connected in multiple.

The main circuits of the system, as shown in the drawing, are as follows: From the positive pole of generator G a main conductor 15 leads through windings 15′ of solenoid 9 to contact block 16 of switch S. Conductor bar 1 of this switch is provided with a conductor brush, 17, which, when in contact with block 16, connects conductor 15 to said switch bar 1 and also to another contact block 18, and thence through resistance R, to a third contact block, 19, and thence through a conductor 20 and ammeter M to the positive pole of the main section, $b'$, of battery B.

The negative pole of battery B, which is also the negative pole of the section $b''$ of that battery, is connected by a conductor 21 to a contact block 22 which, when the switch is in battery-discharging position, is connected to the switch conductor-bar 2 through brush 23; and from contact block 22 the return side of the circuit extends, through conductor 24, to the negative pole of generator G. The field coils F of the generator G are, naturally, connected across between conductors 15 and 24, through the field resistance $F^r$.

With the switch S in the position shown, supposing the generator to be in operation, current is being supplied by said generator to the external circuit and also, through resistor R, to all of the cells of battery B in series, so charging said battery. It is well known that when the charge of a battery is low, its voltage is low as compared with its normal voltage. It is also obvious that, in order that the generator may charge the battery fully, the voltage of the generator must be somewhat greater than that of battery B when fully charged; and therefore it follows that, except as means be taken to prevent, as here described, the generator would supply to the external circuit, during charging of the battery, a greater voltage than that supplied by the battery to that external circuit during discharge.

It is extremely desirable that the voltage in the external circuit shall be practically the same at all times; therefore, to reduce, as to the external circuit, the voltage of the generator current, I arrange to include in circuit with the external circuit and the generator, the section $b''$ of the battery B, including such battery section in such way that its voltage opposes that of the generator, and including in such section $b''$ of the battery such a number of cells that their voltage, acting against the voltage of the generator G as to the external circuit, reduces the voltage of the generator current, in the external circuit, to approximately the voltage of the current supplied by the whole battery B to the external circuit during discharge of the battery. This I accomplish by providing the current tap 25, extending from contact block 26 of the switch S to the dividing point between sections $b'$ and $b''$ of the battery, and by providing the switch brush 27, which connects switch conductor bar 2 to said contact block 26 when the generator is supplying current to the external circuit and is charging the battery. The path of the current from the generator to the external circuit and thence back to the generator is then as follows: from the positive pole of the generator, through conductor 15 to contacts 16 and 17, switch bar 1, connection 4, external conductor 12, the lamps 14, external conductor 13, connection 5, switch bar 2, contacts 27 and 26, current tap 25, the cells of battery section $b''$ in opposition to the voltage of those cells, conductor 21, contact 22, and conductor 24 to the negative pole of the generator.

When, upon the completion of the charge of the battery, the switch S is thrown automatically or otherwise to battery discharging position the connection of the generator G to the battery and to the external circuit is broken at 16, and the connection of the current tap 25 to the external circuit is broken at 26, while the positive pole of the battery B is connected to the external circuit at 19, and the negative pole of the battery is connected to the external circuit at 22; the entire battery being then connected to the external circuit, with battery sections $b'$ and $b''$ in series, so that the full voltage of the battery is available in the external circuit.

It will be seen that when the battery B is being charged as just described, with the section $b''$ included in the external circuit, said battery section $b''$ receives not only the same charge that the section $b'$ receives, but also an additional charge corresponding to the current flowing through the external circuit. Therefore, unless means be taken to prevent, a full charge of battery section $b'$ will result in an over-charge of battery section $b''$. Over-charging of this battery section $b''$ does no harm, as the rate of charge will have fallen greatly, as hereinafter explained, by the time the charging of battery section $b'$ is nearly completed, and as storage batteries are, in general, improved by a certain amount of over-charging. But to reduce the excess charge effect in battery section $b''$ I arrange to draw current from this section $b''$ for various auxiliary purposes during the charging of the battery. For example, I draw current for the ignition circuit of the engine E from this section $b''$, also current to operate a lamp 28; which may be the indicator lamp commonly employed in connection with a generator to show visually that the generator is operating correctly. For so drawing current from the battery section $b''$, the switch brush 27, before mentioned, (which switch-brush, when the switch S is in charging position, is in contact with the contact block 26, and so with the current tap 25) is arranged to contact, in charging position of the switch S, with the contact block 29; from which contact block a conductor 30 leads to the ignition coil 31 of the engine E and thence to the ignition-current distributer 32 of that engine, and from the distributer 32 a conductor 33 leads to the return conductor 21. The lamp 28 is located in a shunt 34 of this ignition circuit 30—33. It will be noted that when the switch S is shifted from battery-charging to battery-discharging position, this ignition circuit 30—33 is broken both at contact block 29 and at contact block 26, so that the engine stops automatically when the charging of the battery is completed and when said switch S throws the battery into connection with the external circuit. When the switch S is thrown to battery-charging position again, this ignition circuit 30—33 is again closed, and at the same time current from the residual charge remaining in battery B passes from the positive pole of that battery through conductor 20, resistor R, switch brush 17, and conductor 15 through the field F and armature of the generator G to the return conductors 24 and 21 and so to the negative pole of battery B.

The generator G is thus operated as a motor to turn over the engine E; and as soon as said engine picks up and drives the generator G at proper speed, the voltage of the generator current, being then in excess of the voltage of the battery current, stops the flow of current from the battery through the generator and charging of the battery, as well as supply of current to the lights in the external circuit begins. The resistor R prevents short-circuiting of the battery B, in case the engine E should fail to start promptly. A low-voltage switch, diagrammatically shown at 53, opens the battery circuit in case the battery voltage falls below a proper minimum. Such switches are well known, and therefore it is not thought necessary to illustrate the construction of such switch.

For the automatic operation of the switch S when the voltage of the battery has so risen, as the result of the charge imparted to it, as to indicate completion of the charge, the voltage-operated relay V is provided. This relay may be of various constructions, but the construction shown is convenient, and in such construction the said relay comprises a solenoid magnet the plunger of which comprises a lower portion 35 of magnetic material, and an upper portion 36, of non-magnetic material; this upper portion 36 having an extension 37 of reduced diameter; there being a shoulder 38 between the sections 36 and 37, which shoulder is adapted to lift a weight 39 of non-magnetic material normally resting on the top of the solenoid. The coils of this solenoid V are connected across the battery terminals, in both charging and discharging positions of the switch, by a conductor 40 extending from conductor 20 to the coils of said solenoid V, and by a conductor 41 extending from the coils of said solenoid V to the contact block 22 of the switch and so to the return conductor 21. When the voltage of the current supply circuit rises, plunger 35 rises into engagement with the weight 39 and remains in that intermediate position (shown in the drawing) until the voltage increases sufficiently to enable the plunger to lift the weight. This plunger is provided with a contact piece 42, adapted in its upper position, to contact with contact pieces 43 and 44, and in its lower position to contact with contact pieces 45 and 46. When the plunger 35 is in its upper position, in contact with contact pieces 43 and 44, a circuit is complete from conductor 20 (and so from the positive pole of the battery B) through conductor 40, branch conductor 47, coils 48 of solenoid 9, conductor 49, contact pieces 44, 42 and 43, to conductor 41 and thence to the return conductor 21. The effect of the completion of this circuit through coil 48 of the solenoid 9 will be explained presently. When the plunger 35 of solenoid V is in its lower position, it completes a circuit from conductor 40 through the coils of the switch-operating solenoid 10 and conductor 50 to contact pieces 46, 42 and 45 and thence to conductor 41 and so to the return conductor 21. When solenoid 10 is so energized its plunger 11, acting upon the switch from the battery-discharging position to the battery-charging position, in which position the switch S will then be held by engagement of the detent 7 with said switch member 3; the outer end of the detent 7 comprising an over-balancing weighted mass so that said detent tends to engage and hold the switch member 3. There may be in circuit conductor 50 a suitable alarm bell or other alarm device, 51, which will ring or otherwise operate while current is so passing through conductor 50, so indicating that the battery is discharged. If charging the battery begins promptly, as it will in case the engine E starts promptly and the generator G begins the generation of the current, the voltage in the circuit 15—20—B—21—24, will rise promptly, and since the circuit 40—V—41 is bridged across conductors 20—21 of the current supply circuit, the plunger 35 of relay V will rise, promptly upon the beginning of charging of the battery, so breaking the circuit of conductor 50 and stopping the operation of the signal device 51.

Solenoid 9 has, besides the coils 15' and 48, already mentioned, other coils, 52, bridged across from conductor 15 to the return conductor 24. The direction of winding and of connection of the coils 15' and 52 to their respective circuits are such that when the generator G is supplying current the current through coil 52 opposes the current through coil 15' and the plunger 8 of solenoid 9 is not raised. But when the voltage relay V completes the circuit through coils 48 of solenoid 9, these coils 48, acting with the coils 52, overcome the effect of the coils 15' on the plunger 8, and said plunger rises, striking the detent 7 and so releasing the switch S. Voltage relay V does not complete the circuit through coils 48, however, until the voltage of the battery has so risen as to indicate completion of the charge of said battery; for while the plunger 35 of relay V rises somewhat, promptly upon the beginning of the charging of battery B, so breaking the circuit of conductor 50, in so rising it encounters the weight 39 and the pull of the solenoid V upon plunger 35 is not sufficient to cause said plunger to lift weight 39, and so to close the circuit through coil 48, until the voltage of the battery has risen to the maximum intended.

In the event that during the charging of the battery the generator should cease to generate current (for example, should the engine E stop), the current from battery B, flowing back through conductor 15 and 15', will cause coil 15' to act in harmony with coil 52 to raise the plunger 8 and cause the latter to trip detent 7, so causing switch S to go to battery-discharging position, connecting the battery to the external circuit and disconnecting it from the generator and so preventing discharge of the battery through the generator. The solenoid 9 therefore serves, not only to stop the engine and throw the battery into the external circuit, when the battery is fully charged, but also to protect the battery from wasteful discharge in case the generator should cease functioning during the charging period.

It will be obvious that in case automatic throwing of the switch S to battery-charging position is not desired, the solenoid 10 may be omitted, and the switch S may be arranged to be closed by hand. In that event, the bell 51 or other suitable signaling device controlled by the relay V may be retained, to indicates when the battery should be recharged.

The graduation of the charge to the battery, due to the rising counter-voltage of the battery, the varying resistance of resistor R, and the rising voltage of generator G during the charging period, will be understood readily from the foregoing explanations, and from the following concrete illustration. Suppose the battery B to be of the well-known pasted lead type, such as is commonly used in vehicle and lighting service, having say 16 cells of a nominal aggregate voltage of 32 volts, battery section $b'$ having 12 cells, and battery section $b''$ having 4 cells. The battery, we will suppose, has a "normal" charging rate of 12 amperes; that is to say, it may be charged at a constant current rate of 12 amperes without injury; but its efficiency will be increased and its life prolonged if a charge be started at 18 amperes and tapered off to 6 amperes at the finish, and the time required for charging will not be increased by so doing. The resistor R may be supposed to have a resistance of $\frac{1}{3}$ ohm when carrying 18 amperes, and to have a resistance of $\frac{1}{4}$ ohm when carrying 6 amperes, with proportionate intermediate resistances for intermediate rates of current flow. The generator voltage, at the brushes of the generator, may be assumed to be 40 volts when generating current at the 18 ampere rate. The resistance of the conductors 15, 20, 21 and 24 may be neglected in this consideration, or treated as part of the resistance of resistor R; in any event the resistance of these conductors will be so small as to be negligible. Then, since the drop in voltage in the generator current in passing through resistor R is, as is well known, equal to the current flowing, in amperes, multiplied by the resistance, in ohms, it follows that when the generator is operating at the 18 ampere rate, producing 40 volts at the brushes, the resistance of resistor R being $\frac{1}{3}$ ohm at that rate, as already assumed, the voltage of the charging current, at the terminals of the battery, will be $40-(18\times\frac{1}{3})=40-6$, or 34 volts; which is the correct voltage for charging the battery at the rate of 18 amperes when the battery is discharged. As the charging progresses the counter-voltage of the battery increases, and the potential difference between the generator voltage and battery voltage decreases, so that the charging current automatically decreases. If the applied voltage at the battery terminals were maintained at 34 volts, charging would soon cease; but as the charging current decreases, the resistance of resistor R decreases, as already explained, and the voltage of the generator current increases (that being, as already explained, a characteristic of the generator used); and this decrease of resistance and increase of generator voltage tends to neutralize in part the effect of the increase in battery voltage on the rate of current flow. Suppose the charging current has dropped to 12 amperes. The generator voltage is then 41, the resistance of R is then $\frac{10}{36}$ ohm, and the voltage at the battery terminals is then $41-(12\times\frac{10}{36})=37\frac{2}{3}$ which is the proper voltage at which to charge the battery at the rate of 12 amperes. By the time the charging current has dropped to 6 amperes the voltage of the generator has risen to 42, the resistance of resistor R has dropped to $\frac{1}{4}$ ohm and the voltage applied at the battery terminals is $42-(6\times\frac{1}{4})=40\frac{1}{2}$, which is the proper voltage to apply near the finish of the charge. In other words, by employing a resistor R of proper ohmic resistance and proper temperature coefficient, and by employing a charging generator of proper characteristic, the charging current will be tapered automatically at precisely the desired rate, as a result of rising countervoltage of the cells during the charge. It will be noted that both the decrease in resistance of resistor R, and the increased voltage of generator G as the charging progresses, act to counteract to the proper extent what would otherwise be an excessive reduction of rate of charge due to rising countervoltage of the battery. During the charging as described, the counter-voltage of the battery will have increased from approximately 2.1 volts per cell to approximately 2.6 volts per cell.

The rising countervoltage of the battery section $b''$ included in the external circuit while the generator is supplying current to that external circuit, not only brings the voltage in that external circuit down to substantially the voltage of the normal current supplied by the battery B to that external circuit, but also substantially neutralizes, as to that external circuit, the effect of the rise in voltage of the generator during the charging. In the above consideration I have assumed that at the start of the charging, the generator voltage is 40 (this voltage value may be produced readily by adjustment of the field rheostat $F^r$) and that the battery normally supplies to the external circuit, when connected to that external circuit, current of about 32 volts (16 cells of approximately 2 volts each). The counter voltage of each of the cells of a tion $b''$, at the beginning of the charge will be approximately 2.1; so that the total countervoltage of this section $b''$ at the beginning of the charge will be approximately 8.4, so that this countervoltage reduces the generator voltage, in the external circuit, to 31.6; approximately the voltage of the current which the whole battery supplies to the external circuit when connected to that circuit. At about the end of the charge, when the generator voltage has risen to 42 volts, the total countervoltage of the battery section $b''$ has risen to 10.4 so that this countervoltage has reduced the voltage of the generator current, in the external circuit, to 31.6; and at intermediate points in the charging period, the counter voltage of the cells $b''$ will keep pace with the rising voltage of the generator, so at all times during the charging period maintaining substantially constant voltage in the external circuit.

The resistor R, besides tending to counteract the tendency to too rapid diminution in rate of charge with rising countervoltage of the battery, has an important stabilizing action with respect to maintaining a proper charging rate notwithstanding temporary variations in generator voltage, due to varying generator speed and like causes.

It is a well known fact that storage batteries on charge are very sensitive to variations in the applied voltage, and I have ascertained in practice that for a battery such as described a variation of 1 volt in the applied potential will make a charge of 6 or more amperes in the charging current taken; or, expressed in another way, a variation of 5% in the voltage of the source of charging current will effect a current variation of about 100% of normal charging current of the battery. For this reason it has heretofore been difficult to successfully charge batteries from small gas-engine-driven generators, owing to the wide variations in speed of such engines, and owing to variations of generator voltage, due to change of temperature. This voltage variation from minute to minute, at the generator, and the gradually changing voltage of the battery, have hitherto practically prevented the attainment of complete automatic charging by a gas-engine-driven generator. But the resistor R causes a reduction of the current from the generator which is applied to charging the battery, this reduction in volts being equal to the current flowing in amperes multiplied by the resistance in ohms. The resistor R is preferably so designed as to increase the resistance with rise of temperature due to an increase in current.

The following may serve as an actual illustration of the action above referred to: Suppose the charging of the battery to be progressing at the rate of 18 amperes, the resistance of resistor R being then ⅓ ohm. In order that the charging current may be increased 6 amperes, that is, may be increased to 24 amperes (at which latter rate the resistance of resistor R will be ½ ohm and there will be a drop of 12 volts during the passage of the current through resistor R, as compared with the drop of 6 volts at that resistor when the current was flowing at the 18 ampere rate) the generator voltage must rise to 46. In other words, to increase the charging current from 18 to 24 amperes requires an increase of generator voltage of 6 volts; which is a very much greater variation than is apt to occur due to any ordinary change of speed of the engine. As a matter of fact, a still greater rise of generator voltage will be required to increase the charging amperage from 18 to 24, because with increased rate of charge the resistance of the battery to charge increases. I have determined that, owing to this action of the battery, a rise of generator voltage from 40 to approximately 47 will be required, with the resistor R functioning as above described, to increase the rate of charge from 18 to 24 amperes; whereas if the resistor R be not used, a rise of the generator voltage of about one volt will be sufficient to increase the rate of charge from 18 to 24 amperes. The use of the resistor R therefore makes the system very many times more stable, with respect to effects of varying generator voltage, than would otherwise be the case.

In order that I may obtain, in resistor R, the maximum variation of resistance with variation of current strength, and in order to eliminate the effects of external conditions, such as air drafts, etc., the conductor comprised in said resistor R may be covered with an insulating material of low heat conductivity, and which is resistant to moderate temperatures; asbestos for example.

By employing a lamp 28 of proper rate of current consumption, the current used in this lamp, and the current used in the ignition apparatus of the engine, may be made to substantially neutralize the excess charge received by battery section $b''$ as above explained.

In case, during the charging of the battery, there be a temporary demand for a heavy current in the external circuit, so that the voltage of the generator drops below that required for charging the battery, the battery will be retarded from unnecessary discharging, by reason of the resistor R which is then interposed between the battery and the external circuit; but if the current required in the external circuit be materially in excess of that which the generator can furnish under such conditions, the battery will assist the generator by adding its current through resistance R to the generator current; the generator and battery being then in parallel with respect to the external circuit.

The cells of the battery section $b''$ are preferably in all respects the same as the cells of the battery section $b'$; in other words, the cells of section $b''$, like the cells of section $b'$ are ordinary storage battery cells, capable of both receiving and delivering current. While in the above description I have referred to these cells as being of the pasted lead type, the cells may be of any suitable type; for example, of the so-called Edison type.

What I claim is:—

1. A combined generator and storage battery current supply system comprising in combination a generator, a multi-cell storage battery, a resistor, and switching means comprising external circuit connections for both sides of an external circuit and means adapted to connect said battery to the external circuit connections during the discharging period of the battery, and to omit the resistor from the battery circuit during such discharging period of the battery and to connect the generator to such battery through the resistor during the charging period of the battery and also to connect the generator, during such charging period, to such external circuit connections through a portion of the battery in opposition to the voltage of that portion of the battery.

2. A combined generator and storage battery current supply system comprising in combination a generator, a multi-cell storage battery, a resistor, switching means comprising external circuit connections for both sides of an external circuit and means adapted to connect said battery to the external circuit connections during the discharging period of the battery, and to omit the resistor from the battery circuit during such discharging period of the battery and to connect the generator to such battery through the resistor during the charging period of the battery and also to connect the generator, during such charging period, to such external circuit connections through a portion of the battery in opposition to the voltage of that portion of the battery, said generator being of a type such that its voltage increases with decrease in current delivery.

3. A combined generator and storage battery current supply system comprising in combination a generator, a multi-cell storage battery, switching means comprising external circuit connections and means adapted to connect said battery to the external circuit connections during the discharging period of the battery, and to connect the generator to such battery during the charging period thereof and also to connect the generator, during such charging period, to such external circuit connections through a portion of the battery in opposition to the voltage of that portion of the battery, said generator being of a type such that its voltage increases with decrease in current delivery, and a resistor of positive temperature coefficient which is connected in series with the battery and between one of the external circuit connections and the battery during the charging period.

4. A combined generator and storage battery current supply system comprising in combination a generator, a multi-cell storage battery, switching means comprising external circuit connections and means adapted to connect said battery to the external circuit connections during the discharging period of the battery, and to connect the generator to such battery during the charging period thereof and also to connect the generator, during such charging period, to such external circuit connections through a portion of the battery in opposition to the voltage of that portion of the battery, and current consuming means connected, during the charging period of the battery, to that portion of the battery which is connected to the external circuit connections, and adapted to draw current from such portion of the battery to neutralize to a greater or less extent the excess charge received by that portion of the battery.

5. A combined generator and storage battery current supply system comprising in combination a generator, a multi-cell storage battery, switching means comprising external circuit connections, and means adapted to connect said battery to the external circuit connections during the discharging period of the battery, and to connect the generator to such battery during the charging period thereof, and also to connect the generator, during such charging period, to such external circuit connections, through a portion of the battery in opposition to the voltage of that portion of the battery, such switching means comprising automatic means for shifting the switching means from charging to discharging condition, and an automatic controller connected to the terminals of the battery and operated by varying voltage and controlling such switch-operating means.

6. A combined generator and storage battery current supply system comprising in combination a generator, a multi-cell storage battery, switching means comprising external circuit connections, and means adapted to connect said battery to the external circuit connections during the discharging period of the battery, and to connect the generator to such battery during the charging period thereof, and also to connect the generator, during such charging period, to such external circuit connections, through a portion of the battery in opposition to the voltage of that portion of the battery, such switching means comprising automatic means for shifting the switching means from charging to discharging condition, and also from discharging to charging condition, and an automatic controller connected to the terminals of the battery and operated by varying voltage and controlling such switch-operating means.

7. The herein described method of supplying current to a circuit and charging a multi-cell storage battery which comprises supplying electric current from a generator to a circuit, and to a multi-cell storage battery, in multiple, during the charging period of such battery, the voltage of the current so supplied to the battery being in excess of the normal discharge voltage of the battery, and the current so supplied to the battery being passed through a resistor of positive temperature coefficient, and simultaneously passing the current supplied by such generator to such circuit through a portion of the cells of said battery, and by the counter-voltage of the storage battery cells so included in said circuit, reducing as to such circuit but not as to the battery as a whole, the excess voltage of the generator current, and by the decreased resistance of said resistor due to decreased current flow occasioned by rising counter-voltage of the battery, during charge, maintaining a sufficient excess current voltage at the battery to overcome the counter-voltage of the battery.

8. The herein described method of supplying current to a circuit and charging a multi-cell storage battery, which comprises supplying electric current from a generator to a circuit, and to a multi-cell storage battery, in multiple, during the charging period of such battery, the voltage of the current so supplied to the battery being in excess of the normal discharge voltage of such battery, the current so supplied to the battery being passed through a resistor of positive temperature coefficient, and the generator being of a type such that its voltage increases with decrease in current delivery, and simultaneously passing the current supplied by such generator to such circuit through a portion of the cells of said battery, and by the counter-voltage of the storage battery cells so included in said circuit, reducing as to such circuit but not to the battery as a whole, the excess voltage of the generator current, and by the rise of voltage of the generator and decreased resistances of the resistor, consequent upon reduced current flow due to rising counter-voltage of the battery, during charge, maintaining in the battery a sufficient excess current voltage to overcome the counter-voltage of the battery.

9. The herein described method of supplying current to a circuit and charging a multi-cell storage battery which comprises supplying electric current from a generator to a circuit, and to a multi-cell storage battery, in multiple, during the charging period of such battery, the voltage of the current so supplied to the battery being in excess of the normal discharge voltage of such battery, and simultaneously passing the current supplied by such a generator to said circuit through a portion of the cells of said battery, and by the counter-voltage of the storage battery cells, so included in said circuit, reducing as to said circuit but not as to the battery as a whole, the excess voltage of the generator current, and during the passage of the current of supply to said circuit through such portion of cells of said battery, drawing current from such portion of the battery, and thereby reducing, as to such portion of the battery, the excess-charge effect.

10. The herein described method of supplying current to a circuit and charging a multi-cell storage battery, which comprises supplying electric current from a generator to a circuit, and to a multi-cell storage battery, in multiple, during the charging period of such battery, the current so supplied to the battery being reduced in voltage, at the battery terminals, with respect to the voltage at the generator terminals, by passing through a resistor, the voltage of the current at the battery terminals being in excess of the normal discharge voltage of such battery, whereby the voltage applied to the battery terminals increases as the charging current, due to rising counter voltage of the storage battery cells, decreases, and simultaneously passing the current supplied by such generator to such circuit through a portion of the cells of said battery, and by the counter voltage of the storage battery cells so included in said circuit, reducing as to such circuit but not to the battery as a whole, the excess voltage of the generator current.

11. In a system of charging storage batteries and supplying current to an external circuit, the combination of a source of current, a storage battery, a resistor, and two-position switching means which, in one position, connect the battery terminals to the external circuit and, in the other position, connect the source of current through the resistor to the battery terminals, and battery connections to said switching means whereby during the charging period of the battery, a substantially constant voltage is maintained on the external circuit and at the same time a variable voltage, capable of producing a tapered charge current of desired maximum and minimum amount, is applied to the battery terminals.

12. In a system of charging storage batteries and supplying current to an external circuit, the combination of a source of current, a storage battery, a resistor, and two-position switching means which, in one position, connect the battery terminals to the external circuit and, in the other position, connect the source of current through the resistor to the battery terminals, and battery connections to said switching means whereby during the charging period of the battery, a substantially constant voltage is maintained on the external circuit and at the same time a variable voltage, capable of producing a tapered charge current of desired maximum and minimum amount, is applied to the battery terminals, and automatic means for changing said switching means from the second to the first position, said automatic means being controlled by the state of the battery as regards completion of charge.

13. In a system of charging batteries and supplying current to an external circuit, the combination of a source of current, a multi-cell storage battery having terminal connections and an intermediate connection, a resistor, and two-position switching means which, in one position, connect the battery terminals to the external circuit and, in the other position, connect the source of current through the resistor to the battery terminals and also connect the source of current to the external circuit with a portion of the battery included in said external circuit in opposite relation, whereby during the charge period a substantially constant voltage, approximately equal to the normal voltage of the battery, is maintained on the external circuit and a variable voltage, increasing with the state of charge of the batteries, is applied to the battery terminals.

14. In a system of charging storage batteries and supplying current to an external circuit, the combination of a generator, an internal combustion engine for driving the generator, a multi-cell storage battery, a resistor of positive temperature coefficient, and two-position switching means which, in one position, connects the battery terminals to the external circuit and, in the other position, connect the generator through the resistor to the storage battery and also complete an ignition circuit for the engine, whereby the battery current is applied to the generator through the resistor causing the generator to act as a motor and turn the engine, and when the engine begins to run under its own power, the motor resumes its functions as a generator and delivers current through the resistor to the battery, whereby due to the action of the resistor and the rising counter-voltage of the battery, an increasing voltage is applied to the battery terminals as the charge progresses, said switching means comprising means for breaking the generator connection and at the same instant breaking the ignition circuit to stop the engine and connecting the external circuit to the battery between the resistor and the battery terminal.

15. In a system of charging storage batteries and supplying current to an external circuit, the combination of a generator, the voltage of which increases with decreasing current flow, an internal combustion engine for driving the generator, a multi-cell storage battery, a resistor and two-position switching means which, in one position, connect the battery terminals to the external circuit and, in the other position, connect the generator through the resistor to the storage battery and also complete an ignition circuit for the engine, whereby the battery current is applied to the generator through the resistor causing the generator to act as a motor and turn the engine, and when the engine begins to run under its own power, the motor resumes its functions as a generator and delivers current through the resistor to the battery, whereby due to the action of the generator and the rising counter-voltage of the battery, an increasing voltage is applied to the battery terminals as the charge progresses, said switching means comprising means for breaking the generator connection and at the same instant breaking the ignition circuit to stop the engine and connecting the external circuit to the battery between the resistor and the battery terminal.

16. In a system of charging storage batteries and supplying current to an external circuit the combination of a generator, the voltage of which increases with decreasing current flow, a multi-cell storage battery, a resistor of positive temperature coefficient, and two-position switching means having external circuit connections, which switching means, in one position, connect the battery terminals to the external circuit, and, in the other position, connect the generator through the resistor to the storage battery, and also connect one side of the generator to an external circuit connection of the switching means and connect another external circuit connection of the switching means, through a portion of the battery in opposing relation to the generator current, to the other side of the generator, the total voltage of the storage battery cells so included in the external circuit, being approximately equal to the excess of generator voltage over that of the normal discharge voltage of the storage battery, and the rate of rise of voltage of the cells so included in the external circuit being substantially the same as the rate of rise of the generator voltage during charging.

17. A combined generator and storage battery current supply system comprising in combination a generator, a storage battery, and switching means comprising external circuit connections and contacts adapted in one position of said switching means, to connect the storage battery to said external circuit connections, and in another position to connect the generator to the storage battery terminals, and also to the external circuit connections, and a resistor, said switching means comprising contacts, one of which is closed and connected to the generator and to the external circuit when the switching means is in battery-charging position, the other of which contacts is closed and connected to a battery terminal and to one of the external circuit connections, when the switching means is in battery discharging position, the resistor being connected at one end to one such contact and at the other end to the other such contact, whereby during the charging of the battery the current supplied by the generator to the battery passes through the resistor, and whereby when said switching means is in battery-discharging position the resistor is cut out.

18. A combined generator and storage battery current supply system, comprising in combination a generator, a storage battery, and switching means comprising external circuit connections and means adapted to connect said battery to the external circuit connections during the discharging period of the battery, and to connect the generator to such battery and to the external circuit connections during the charging period of the battery, said switching means comprising a contact piece connected both to one terminal of the battery and to one terminal of the generator, and comprising also contact means adapted to connect that contact piece to one external circuit connection when the switching means is in battery-discharging position.

19. A combined generator and storage battery current supply system comprising in combination a generator, a storage battery, switching means comprising external circuit connections and means adapted to connect said battery to the external circuit connections during the discharging period of the battery, and to connect the generator to such battery during the charging period thereof, and also to connect the generator, during such charging period, to such external circuit connections, said switching means comprising means tending to throw the switch from battery charging to battery discharging position, and a detent adapted to prevent such throwing of the switch, and a differentially wound magnet and armature therefor, the latter arranged when attracted to operate said detent to release the switch, said magnet comprising two coils through which the generator current passes in opposing directions when the generator is supplying current to the battery and external circuit, and through which coils current passes in directions to cause said coils to coöperate when the battery supplies current to the generator.

20. A combined generator and storage battery current supply system comprising in combination a generator, a storage battery, switching means comprising external circuit connections and means adapted to connect said battery to the external circuit connections during the discharging period of the battery, and to connect the generator to such battery during the charging period thereof, and also to connect the generator during such charging period, to such external circuit connections, said switching means comprising means tending to throw the switch from battery charging to battery discharging position, and a detent adapted to prevent such throwing of the switch, and a differentially wound magnet and armature therefor, the latter arranged when attracted to operate said detent to release the switch, said magnet comprising two coils through which the generator current passes in opposing directions when the generator is supplying current to the battery and external circuit, and comprising also a third coil adapted when energized to coöperate with one of said first mentioned coils to cause said magnet-armature to actuate the detent, and electro-magnetically operated contact means, influenced by rising voltage of the battery, arranged to close circuit through such third coil when the battery voltage reaches a predetermined maximum.

21. A combined generator and storage battery current supply system comprising in combination a generator, a storage battery, switching means comprising external circuit connections and means adapted to connect said battery to the external circuit connections during the discharging period of the battery, and to connect the generator to such battery during the charging period thereof, and also to connect the generator during such charging period to such external circuit connections, said switching means comprising means tending to throw the switch from battery charging to battery discharging position, and a detent adapted to prevent such throwing of the switch, a differentially wound magnet and armature therefor, the latter arranged when attracted to operate said detent to release the switch, said magnet comprising two coils through which the generator current passes in opposing directions when the generator is supplying current to the battery and external circuit, and comprising also a third coil adapted when energized to coöperate with one of said first mentioned coils to cause said magnet-armature to actuate the detent, electro-magnetically operated contact means, influenced by varying voltage of the battery, arranged to close circuit through such third coil when the battery voltage reaches a predetermined maximum, and electro-magnetically operated means for throwing the switch from battery discharging to battery charging position, the said electro-magnetically operated contact means which is influenced by varying battery voltage comprising means for closing circuit through said electro-magnetically operated switch operating means when the battery voltage falls to a predetermined minimum.

22. A switch for use in a combined generator and storage battery current supply system, comprising in combination two movable switch arms, and external-circuit connections, to one of which one of said movable switch arms is connected and to the other of which the other of said movable switch arms is connected, and battery and generator contacts for said switch arms such that both sides of the battery may be connected to the external circuit through said switch in one position of the switch arms, and that the generator may be connected to the battery and to the external circuit in the opposite position of said switch arms, and means for operating said switch arms in unison, means for throwing said switch from the one position to the other, a detent adapted to prevent such throwing of the switch, and automatic means for operating said detent.

23. A combined generator and storage battery current supply system comprising in combination a generator, a multi-cell storage battery, and switching means comprising external circuit connections and means adapted to connect said battery to the external circuit connections during the discharging period of the battery, and to connect the generator to such battery during the charging period thereof and also to connect the generator, during such charging period, to such external circuit connections through a portion of the battery in opposition to the voltage of that portion of the battery, and an internal combustion engine for driving said generator, having an ignition circuit controlled by said switch and deriving current from the portion of the battery so included in the external circuit, said switch having contacts which close said ignition circuit when the switch is in battery-charging position and open said ignition circuit when the switch moves to battery-discharging position.

24. In a system of charging storage batteries and supplying current to an external circuit, the combination of a generator, an internal combustion engine for driving the generator, a storage battery, a resistor of positive temperature coefficient, and two-position switching means which, in one position, connect the battery terminals to the external circuit and, in the other position, connect the generator through the resistor to the storage battery, whereby the battery current is applied to the generator through the resistor, causing the generator to act as a motor and turn the engine, and when the engine begins to run under its own power, the motor resumes its function as a generator and delivers current through the resistor to the battery, and whereby during the starting of the engine the resistor prevents short-circuiting of the battery, in case the engine should fail to start promptly.

25. In a system of charging storage batteries and supplying current to an external circuit, the combination of a generator, an internal combustion engine for driving the generator, a storage battery, a resistor of positive temperature coefficient, and two-position switching means which, in one position, connect the battery terminals to the external circuit and, in the other position, connect the generator through the resistor to the storage battery, whereby the battery current is applied to the generator through the resistor, causing the generator to act as a motor and turn the engine, and when the engine begins to run under its own power, the motor resumes its function as a generator and delivers current through the resistor to the battery, and whereby during the starting of the engine the resistor prevents short-circuiting of the battery, in case the engine should fail to start promptly, and whereby during the charging of the battery an increasing voltage is applied to the battery terminals as the charge progresses.

26. In a system of charging storage batteries and supplying current to an external circuit, the combination of a generator the voltage of which increases with decreasing current flow, an internal combustion engine for driving the generator, a storage battery, a resistor of positive temperature coefficient, and two-position switching means which, in one position, connect the battery terminals to the external circuit and, in the other position connect the generator through the resistor to the storage battery, whereby the battery current is applied to the generator through the resistor, causing the generator to act as a motor and turn the engine, and when the engine begins to run under its own power, the motor resumes its function as a generator and delivers current through the resistor to the battery, and whereby during the starting of the engine the resistor prevents short-circuiting of the battery, in case the engine should fail to start promptly, and whereby during the charging of the battery an increasing voltage is applied to the battery terminals as the charge progresses.

27. A combined generator and storage battery current supply system comprising in combination a generator, a storage battery, switching means comprising external circuit connections and means adapted to connect said battery to the external circuit connections during the discharging period of the battery, and to connect the generator to such battery during the charging period thereof, and also to connect the generator, during such charging period, to such external circuit connections, said switching means comprising means tending to throw the switch from battery charging to battery discharging position and a detent adapted to prevent such throwing of the switch, and means for operating said detent to release the switch, comprising means arranged to actuate such detent when the battery supplies current to the generator, and comprising other means, influenced by rising voltage of the battery, arranged to actuate the said detent when the battery voltage reaches a predetermined maximum.

28. The herein described method of supplying current at substantially uniform voltage to a circuit, and simultaneously charging a storage battery with progressively decreasing rate of current supply to that battery, which comprises supplying electric current from a generator to a circuit and to a storage battery, in multiple, passing such charging current to the battery through a resistor which consumes, initially, a considerable proportion of the total voltage of the charging circuit, such resistor not being included in the circuit to which current is supplied in multiple with respect to the battery, and by the rising counter voltage of the battery and the consequent progressively decreasing proportion of the voltage consumed in such resistor to the total voltage in the charging circuit, reducing progressively the charging current to the battery independent of the supply of current to the said circuit to which current is supplied in multiple with respect to the battery, and at a rate less than such charging current would be reduced by the rising counter voltage of the battery, if such resistor were not included in circuit with the battery.

29. A combined current supply and storage battery charging system comprising in combination a generator, a storage battery, and a circuit to which current is to be supplied from the generator, such battery and circuit connected to the generator in multiple, and a resistor connected in series with the battery, but not included in such circuit connected in multiple with the battery, such resistor proportioned to consume, initially, a considerable proportion of the total voltage in the charging circuit, whereby as the counter voltage of the battery rises during charging, and the resistor consequently consumes a progressively decreasing proportion of the total voltage in the charging circuit, the charging current applied to the battery terminals is decreased independent of the supply of current to the said circuit to which current is supplied in multiple with respect to the battery, and at a rate less than would be the case but for the presence of such resistor in circuit with the battery.

In testimony whereof I have signed this specification in the presence of two subscribing witnesses.

CLARENCE A. DAWLEY.

Witnesses:
PAUL H. FRANKE,
H. M. MARBLE.